(12) United States Patent
Schmidt et al.

(10) Patent No.: US 8,531,047 B2
(45) Date of Patent: Sep. 10, 2013

(54) ENERGY CONVERTER, COUNTER WITH ENERGY CONVERTER, SYSTEM WITH COUNTER, METHOD FOR CONVERTING MECHANICAL ENERGY INTO ELECTRICAL ENERGY, AND COUNTING METHOD

(75) Inventors: Frank Schmidt, Altkirchen (DE);
Holger Alfons Eggert, Gräfelfing (DE)

(73) Assignee: Enocean GmbH, Oberhaching (DE)

( * ) Notice: Subject to any disclaimer, the term of this patent is extended or adjusted under 35 U.S.C. 154(b) by 559 days.

(21) Appl. No.: 12/667,203

(22) PCT Filed: Jun. 10, 2008

(86) PCT No.: PCT/EP2008/057230
§ 371 (c)(1),
(2), (4) Date: Jun. 21, 2010

(87) PCT Pub. No.: WO2009/003799
PCT Pub. Date: Jan. 8, 2009

(65) Prior Publication Data
US 2011/0007862 A1  Jan. 13, 2011

(30) Foreign Application Priority Data
Jun. 29, 2007  (DE) .................. 10 2007 030 055

(51) Int. Cl.
*F02B 63/04*  (2006.01)
(52) U.S. Cl.
USPC ............................................ 290/1 R; 377/15
(58) Field of Classification Search
USPC ............................................ 377/15; 290/1 R
See application file for complete search history.

(56) References Cited

U.S. PATENT DOCUMENTS

| | | | |
|---|---|---|---|
| 3,038,108 A | 6/1962 | Hajny | |
| 4,450,362 A * | 5/1984 | Gallagher | 290/55 |
| 6,291,900 B1 | 9/2001 | Tiemann et al. | |
| 6,744,356 B2 | 6/2004 | Hamilton et al. | |
| 7,129,593 B2 * | 10/2006 | King et al. | 290/4 C |
| 7,151,322 B2 * | 12/2006 | Eskandr | 290/1 R |
| 7,205,732 B1 * | 4/2007 | Gold | 318/142 |
| 7,834,471 B2 * | 11/2010 | Cripps | 290/1 E |
| 2003/0042807 A1 * | 3/2003 | Blake | 310/66 |
| 2003/0125600 A1 | 7/2003 | Nagano | |
| 2006/0152009 A1 | 7/2006 | Wilt, Jr. et al. | |
| 2007/0120430 A1 * | 5/2007 | Kurosawa | 310/74 |

FOREIGN PATENT DOCUMENTS

| | | |
|---|---|---|
| BE | 896 141 | 7/1983 |
| EP | 1 610 100 | 6/2005 |
| JP | 60-122831 | 7/1985 |

(Continued)

OTHER PUBLICATIONS

Japanese Examination Report for Japanese Patent Application No. 2010513834 dated Jul. 24, 2012 (English Translation).

*Primary Examiner* — Michael Zarroli
(74) *Attorney, Agent, or Firm* — Foley & Lardner LLP (57) ABSTRACT

An energy converter is disclosed which is provided for converting mechanical energy into electrical energy. Also disclosed is a counter, which includes its operating energy and also the counting information or the counting pulses from the energy converter named above. A method is also disclosed for converting mechanical energy into electrical energy. Also disclosed is a method for operating the counter with the electrical energy obtained according to the method. Also disclosed is a system made from at least one or more of the counters named above.

32 Claims, 5 Drawing Sheets

(56) References Cited

FOREIGN PATENT DOCUMENTS

| | | |
|---|---|---|
| JP | 10-077947 | 3/1998 |
| JP | 2002-267510 | 9/2002 |
| JP | 2003-056451 | 2/2003 |
| JP | 2003-233459 | 8/2003 |
| JP | 2005-124347 | 5/2005 |
| WO | WO 02/073141 | 9/2002 |
| WO | WO 2005/003693 | 1/2005 |

* cited by examiner

ENERGY CONVERTER, COUNTER WITH ENERGY CONVERTER, SYSTEM WITH COUNTER, METHOD FOR CONVERTING MECHANICAL ENERGY INTO ELECTRICAL ENERGY, AND COUNTING METHOD

RELATED APPLICATIONS

This is a U.S. national stage of application No. PCT/EP2008/057230, filed on Jun. 10, 2008.

This application claims the priority of German application No. 10 2007 030 055.9 filed Jun. 29, 2007, the entire content of which is hereby incorporated by reference.

FIELD OF THE INVENTION

The invention relates to an energy converter that is provided to convert mechanical energy into electrical energy and also relates to a counter that includes its operating energy and also the counting information or the counting pulses from the aforementioned energy converter. The invention further relates to a method for converting mechanical energy into electrical energy and also relates to a method for operating the counter with the electrical energy obtained according to the method. The invention also relates to a system made from at least one or more of the aforementioned counters.

BACKGROUND OF THE INVENTION

For detecting consumption data, counting devices or mechanical counting units are known that are constructed to detect a volume flow of a fluid. These mechanical counting units are constructed in such a way that, by means of the volume flow, for the most part one counting wheel is driven directly or indirectly, which transfers each rotation to a counting unit. For a known cross section of the volume flow, an exact, defined volume can be allocated to each rotation. In this way, the volume flow can be detected with the counting unit. Such mechanical volume flow counters usually do not provide a connection to other devices and must be read "by hand." Remote electronic querying or similar functions thus are not to be realized. An advantage of these devices is high operating reliability since these devices exhibit high stability under loading and have a long service life and are independent of auxiliary energy sources, such as, for example, electrical energy. However, one disadvantage is that the data detected by the device can only be read manually and only on site directly from the device.

It is further generally known to detect a volume flow on the basis of a magnetically inductive flow-rate measurement. Here, under the use of Faraday's Law of Induction, an electrical voltage is induced. This voltage is a measure of the volume flow for a known cross section of a flowing fluid. This measurement principle uses the separation of moving charge in a magnetic field. The fluid to be measured flows through a tube made from non-magnetic material with an electrically insulating lining. Charge carriers contained in the fluid are deflected by a magnetic field that is perpendicular to the direction of flow. High-impedance electromotive forces, which generate electrical voltages in the millivolt range on electrodes made from corrosion-resistant material and mounted in the tube, are created by the charge separation. A disadvantage of this measurement principle is the limitation of applicability just to electrically conductive fluids. For gases, the method is based on the lack of electrical conductivity. Thus, this method cannot be applied to all fluids.

It is further generally known to perform a flow-rate measurement and thus a detection of the volume flow according to the so-called differential-pressure method. Here, the kinetic energy of a fluid is converted into potential energy, which can be measured as a pressure. A diaphragm, provided as a perforated disk for reducing the flow cross section forces the flowing fluid to increase its velocity. The kinetic energy is increased. In this way, according to the law of conservation of energy, the pressure of the fluid after the diaphragm is smaller. The potential energy of the fluid decreases. This pressure difference is measured with a sensor and converted in an evaluation device into the volume flow. A disadvantage here is that such measurement arrangements require an external energy supply. This is formed either by an electrochemical energy storage device, for example, an accumulator, or by a power supply. Such dependence leads to high maintenance expense or installation expense, because a necessary power supply is to be installed up to the relevant counter, or the electrochemical energy storage device, for example, the battery, must be replaced at regular time intervals. In particular, in connection with an electrochemical energy storage device, a reliable and steady energy supply is also not ensured, so that in times without an electrical supply of energy, no measurement or no volume-flow detection can take place. Also, a power supply-dependent energy detection or energy supply is not, in principle, free of interruptions, so that here lack of volume-flow detection is also possible at times of energy interruption.

The document US 2003/125600 A1 discloses a moving system which is suitable to keep itself in a rectilinear movement. The electrical energy generated by the system disclosed in US 2003/125600 A1 is utilized to self-excite the oscillation in the spring, wherein that oscillation is essential for the system to move. Even though US 2003/125600 A1 discloses in FIG. 4 and FIGS. 5A to 5D an energy converter with a first element and a second element wherein the first element is coupled mechanically to the second element by means of a coupling element and wherein the coupling element is constructed to store mechanical energy and to output stored mechanical energy and wherein the first element receives a movement of a medium, and transmits the movement to the coupling element, and wherein a means is provided, which prevents, with a predetermined retaining force, a transmission of the movement to the second element until the retaining force is exceeded, the converted electrical energy couldn't be applied to be transmitted to a radio transmitting device or a radio transmitting and receiving device.

SUMMARY OF THE INVENTION

One object of the invention is to provide reliable operation and thus reliable detection of the volume flow of a fluid and in this way to reduce the operating expense or the installation expense.

This and other objects are attained in accordance with one aspect of the present invention directed to an energy converter comprising one first element and one second element; a coupling element, wherein the first element is coupled mechanically to the second element by said coupling element, wherein the coupling element is constructed both to store mechanical energy and also to output stored mechanical energy, and wherein the first element receives a movement of a medium and transmits to the coupling element: and a means for preventing with a predetermined retaining force, a transmission of the movement to the second element until the retaining force is exceeded; wherein the coupling element outputs mechanical energy to the second element, and wherein the second element is constructed as an electromechanical converter, which converts the introduced movement energy into electrical energy; and a radio transmit device or a radio transmit and receive device coupled to the energy converter, wherein said device is operated by electrical energy generated by the energy converter.

Another aspect of the invention is directed to a method for converting mechanical energy into electrical energy in which a first element receives mechanical movement and a second element is mechanically coupled to the first element in such a way that the mechanical energy received from the movement is collected in a mechanical energy storage device before transmission to the second element, wherein a predetermined retaining force is provided, which holds the second element up to a predetermined upper mechanical energy level in the mechanical energy storage device, and the second element converts the mechanical energy into electrical energy, and the electrical energy which is generated by the electromechanical converter operates a radio transmitter or a radio transmit-receive device that is coupled to the electromechanical converter.

An energy converter is proposed in which a first and a second element are provided, wherein the first element receives mechanical energy, for example, in the form of a movement, and transfers it to a coupling element. The coupling element is used for mechanical coupling between the first and the second element and is constructed as a mechanical energy storage device. The second element is constructed as an electromechanical converter, which converts mechanical energy into electrical energy. Various converter systems following various physical principles are suitable for this purpose. Thus, for example, electromagnetic converters, piezoelectric converters, or also other electromechanical converters are suitable.

Volume flows of fluids, wherein gases or liquids are designated as fluids, can flow in different velocity ranges depending on requirements. Very low flow rates are also conceivable. For this reason, the coupling element is provided as an energy storage device, which collects the mechanical energy introduced by the first element into the coupling element and which, after reaching a transition point at a predetermined upper energy level, outputs to the second element for a short time. Here, a short time means that the time in which the energy is output to the second element is shorter than the period for the collection of the energy. The time period and the time profile of the energy output from the coupling element to the second element are here independent of the time period and the time profile of the energy consumption of the coupling element from the first element. In this way, by varying the upper energy level, by varying the embodiment of the coupling element, and by varying the embodiment of the second element energy can be output quickly to the second element, so that the second element is stimulated to move. The motion stimulated in this way allows a conversion of the mechanical energy into electrical energy and here also allows a voltage and current intensity level at which electrical loads, such as, for example, electronic circuits, can be operated. The rate of movement on an electromechanical converter acts directly on the electrical voltage that can be generated in an electromechanical energy converter. In the measures described above, it is advantageous that this basic principle is taken into account independently of the velocity of the fluid.

In this way, it is also achieved that at very low flow rates in which a direct coupling between the first and the second element would cause no movement energy on the second element, electrical energy can be generated at a meaningful level, which can also be used for further use or even as an energy source. Another advantage is that the measures described above can be applied independently of the temperature or the material compositions or physical properties of the fluid. The described measures act independently of whether the fluid to be measured is a gas or liquid, electrically conductive or insulating. Also, the fluid temperature is not important with respect to the feasibility of the measures described above.

Electrical energy is usable in a meaningful way for additional or downstream devices only above a certain voltage. However, an appropriate voltage can be generated only above a certain velocity of a state change or movement. At a slow flow rate, a sufficient voltage could not be formed without the measures described above. The advantage of the proposed energy converter is consequently based on the fact that the mechanical energy is transferred by means of the first element to the coupling element and can be stored in this coupling element without losses. Above the transition point at a predetermined upper energy level, this is likewise output to the electromechanical energy converter without losses apart from minimal friction losses. This energy converter then converts the mechanical energy into electrical energy under consideration of its efficiency.

Therefore, because the time segment of the output of the mechanical energy to the second element, and thus to the electromechanical energy converter, is independent of the time that energy is input into the coupling element, the electrical pulse that is obtained is always of the same quality. This means that the voltage that can be generated is likewise identical.

To determine an upper mechanical energy level and thus a transition point at which the mechanical energy is output to the second element, a retaining force is provided that can be preset. This means mechanical energy is introduced into the coupling element by means of the first element, so that by means of this retaining force the coupling element is prevented from transferring the energy immediately to the second element. Only when sufficient mechanical energy is introduced in the mechanical energy storage device is the retaining force exceeded starting at a predetermined upper energy level. The mechanical energy is then output to the second element and the mechanical energy still stored in the coupling element is output.

The principle forming the basis of the measures described above is suitable not only for receiving or obtaining energy from a slowly flowing fluid flow, but is also suitable for converting mechanical energy into electrical energy when the mechanical energy is given by small or slow movements. One example here is a change in size due to a change in temperature in a solid body. Depending on what type of movement is to be converted into electrical energy, the first element of the principle described above is to receive the mechanical movement and thus the mechanical energy either by means of a rotational movement or by means of a longitudinal movement.

To introduce the necessary retaining force, it is possible to hold either the second element directly or the coupling between the coupling and the second element or the coupling element directly by means of a holding element. The holding element can be formed here by a magnetic element, a coupling, or similar devices. The embodiment of the holding element is preferably formed so that after overcoming the retaining force, the highest possible percentage of the energy stored in the mechanical energy storage device, the coupling element, can be transmitted to the second element. Losses due to friction in the holding element should be reduced to a minimum. For this reason, for example, holding elements involving mechanical friction are suitable only conditionally. Preferably, magnetically active holding elements are provided.

A magnetic holding element produces the advantage that the retaining force of the holding element can be influenced by means of various parameters. In this way, the amount of mechanical energy stored in the mechanical energy storage device can be set. Thus, for example, by spacing the magnetic element relative to another corresponding magnetic element, the retaining force can be set. The other magnetic element can be, for example, a permanent magnet or a ferromagnetic component or a coil. A coil offers the additional possibility of influencing the magnetic force by means of a current flux and thus also influencing the retaining force.

In a preferred embodiment, the mechanical energy storage device is formed by a mechanical spring element, which is, for example, a spiral spring. Mechanical energy storage devices have the advantage relative to other, for example, electrical energy storage devices, that the energy stored in these devices undergoes absolutely no losses. Thus, for example, a tensioned spring is in the position to store mechanical energy and, independently of the storage period of this energy, the spring can output this energy again completely at an arbitrary time. Thus, mechanical energy storage devices differ from electrical energy storage devices essentially in that the electrical energy storage device suffer losses in the stored energy, wherein the losses result from leakage current. Therefore, the electrical charge stored in an electrical energy storage device decreases.

As an alternative to the holding element, the electromechanical converter can be constructed by a stepper motor, so that the retaining force formed by the stepper motor can be used as a retaining force for the energy storage device when changing from a first step to a subsequent step. In this way it is advantageously achieved that the retaining force and energy converter can be realized by a structural unit in the stepper motor.

For solving the problem, a counter is further provided, whose energy supply and measurement value determination is given by an electromechanical energy converter according to the principle described above. For this purpose, the energy converter is coupled to an electronic processing device. To produce a result that can be counted and evaluated and thus a volume flow that can be calculated and counted, according to one advantageous embodiment of the counter, the electromechanical converter is designed in such a way that a preset path or a given angle of rotation corresponds to a preset dimensional unit of the volume flow. If the electromechanical converter is constructed as a stepper motor, which requires, for each complete rotation, four steps of equal size, then, for example, for each rotation of the electromechanical converter, four pulses are generated. One pulse then corresponds to an angle of rotation of 90°. Depending on the cross section of the volume flow, an exact volume flow is to be allocated to each 90° rotation and thus to each electrical pulse. To reach the result of the entire volume flow per unit of time, only the pulses are to be counted and multiplied with the volume flow allocated to one pulse.

Because sufficient voltage and thus electrical energy is generated with each electrical pulse generated by the electromechanical converter described above, in order to operate a downstream electrical or electronic device, it is possible to operate the processing device with each individually generated electrical pulse and also to couple downstream devices, for example, a radio transmitter device or a radio transmit-receive device to the energy converter, and in this way to transmit with each electrical pulse a radio signal that can be received by a remote reception device. Such an electrical radio signal then contains, for example, identification features of the transmitter or the counter, so that corresponding calculations and allocations to the volume flow can also be performed in the remote reception device.

In one advantageous embodiment, in addition to the processing device, an electronic memory is also provided, which is designed for counting and summing the number of electrical pulses. Preferably, the electronic memory is integrated in the processing device. Thus, a predetermined number of pulses can be collected and summed and a radio signal is transmitted only after reaching a predetermined total number of pulses. Thus the relatively energy-intensive process of transmission of a radio signal can be kept to a minimum. Thus, the overall energy balance of the counter can also be optimized. This is especially advantageous because the source for the available electrical energy is only the movement of the fluid whose volume flow is to be detected.

In an advantageous embodiment, an electrical voltage rectifying unit is connected after the electromechanical converter and thus a direct voltage is generated that can be stored in an electrochemical or electro-capacitive energy storage device, such as, for example, a capacitor. All of the components of the counter, which require electrical energy for their operation, such as, for example, the evaluation device and the electrical storage device and the radio transmitter or radio transmit-receive device can then be supplied with the electrical energy from this electrical energy storage device. It is provided in parallel that a pulse signal is obtained for counting the pulses so that the electrical memory unit and the electronic processing device also receive information on the number of pulses. This signal is fed in parallel to the rectifying unit of the electronic processing unit.

With a counter following the principle described above, a system is possible in which a counter acts in connection with other counters and the data is transmitted to a central unit. The central unit then receives the signals output by the counters and also their data contents, and then evaluates and further processes these contents.

If the individual counters are equipped with a radio transmit-receive unit, data from an adjacent counter can be received by each counter, optionally fed to other calculations in the processing unit, stored, and finally forwarded together with data of each individual counter to the central reception unit. Thus it is possible to arrange a counter also at great distances beyond its functional range, apart from the central reception unit. Then, by means of adjacent counters, the data of the remote counter is passed to the central unit.

In addition, through the receive unit provided on the counters, a notification output by the central unit, data modifications, firmware updates, etc., are possible in the direction of the counter for each radio transmission. The central unit is designed to execute additional actions by means of the counter and the parameters transmitted by the results or to execute an action as a function of a user request, optionally also relative to the counters.

BRIEF DESCRIPTION OF THE DRAWINGS

In the following, the invention is explained in more detail with reference to an embodiment for an energy converter, a counter, and a system with the counter. Shown are.

DETAILED DESCRIPTION OF THE DRAWINGS

Figure 1:
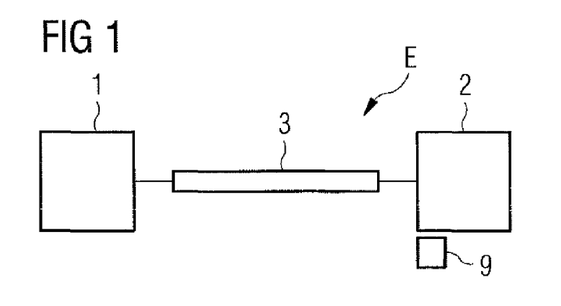
FIG. 1, a schematic diagram of an energy converter.

FIG. 1 shows a schematic diagram of an electronic converter E according to the principle described above, in which a first element 1 is coupled to a second element 2 via a coupling element 3. The coupling element 3 is constructed as a mechanical energy storage device. The first element 1 is designed to transmit the movement of a medium or the resulting movement energy into the coupling element 3. The coupling element 3 is coupled to the second element 2 in such a way that a retaining force formed by a holding element 9 must first be overcome before the second element 2 is made to move. The second element 2 here includes an electromechanical energy converter and thus converts the introduced mechanical energy into electrical energy.

Figure 2:
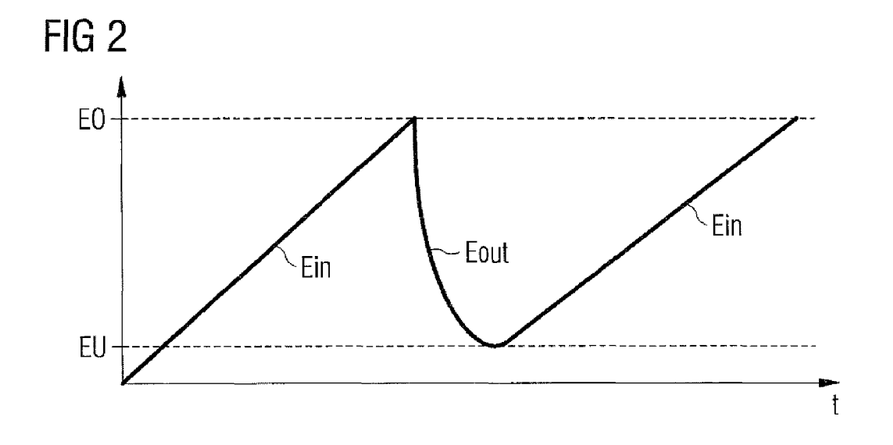
FIG. 2, an energy charging and discharging diagram of the mechanical energy storage device, FIG. 3, a partial schematic diagram of an embodiment of the energy converter, FIG. 4, a schematic diagram of a counter, FIG. 5, a schematic diagram of a step converter, FIG. 6, a schematic diagram of a counter, FIG. 7, a schematic diagram of a counter, FIG. 8, a schematic diagram of a system with a counter, FIG. 9, a circuit diagram of a rectifying device with capacitor, FIG. 10, a voltage-time diagram on the electromechanical energy converter, FIG. 11, a voltage-time diagram of the rectifying unit, and FIG. 12, another voltage-time diagram of the rectifying unit.

Viewing FIG. 1 together with FIG. 2, it is shown in what form and in what time sequence the energy is stored in the mechanical energy storage device 3 formed by the coupling element 3. The diagram is based on uniform movement of the first element 1. The rising edge Ein shows the inlet of the mechanical energy into the coupling element 3 and thus into the mechanical energy storage device 3. In one test configuration, the uniform movement of the first element 1 can be produced by an electric motor that drives the first element by means of a gear. At an installation location, such a uniform movement is only rarely given due to fluctuations in flow rate. In the diagram, a lower energy level EU and an upper energy level EO are formed by dashed lines, each running parallel to the time axis T. Beginning at the origin, energy input Ein is introduced into the coupling element for the time t by a uniform and steady movement of the first element. When the upper energy level EO is reached, the retaining force of the holding element 9 is reached, so that the mechanical energy is output from the mechanical energy storage device 3 to the second element 2. The transmission Eout of the mechanical energy from the energy storage device 3 to the second element 2 takes place in a shorter time than the charging process Ein. This output processor Eout runs nearly burst-like in comparison with the energy input into the mechanical energy storage device. Through the energy introduced into the second element 2, this element is stimulated into motion, which is converted into electrical energy in the second element 2. This electrical energy can be used for operating downstream electrical or electronic devices. If the electromechanical energy converter 2 is an electromagnetic energy converter, then the magnitude of the obtained electrical voltage is given from the rate of change in the magnetic flux and thus also the velocity of the movement.

Accordingly, it will become clear where, in detail, the advantages of such energy conversion lie. Independently of the velocity at which the first element 1 is moved, the coupling element 3 collects the movement energy and stores it in the form of static energy. When the holding point is exceeded at the upper energy level EO, the energy stored as static energy is converted burst-like into kinetic energy at the second element 2. There, the kinetic energy is converted into electrical energy. A direct conversion of the kinetic energy on the first element 1, which the first element 1 introduces into the coupling element 3, would generate no electrical energy or at least no measurable energy and thus also no usable electrical energy level.

Figure 3:
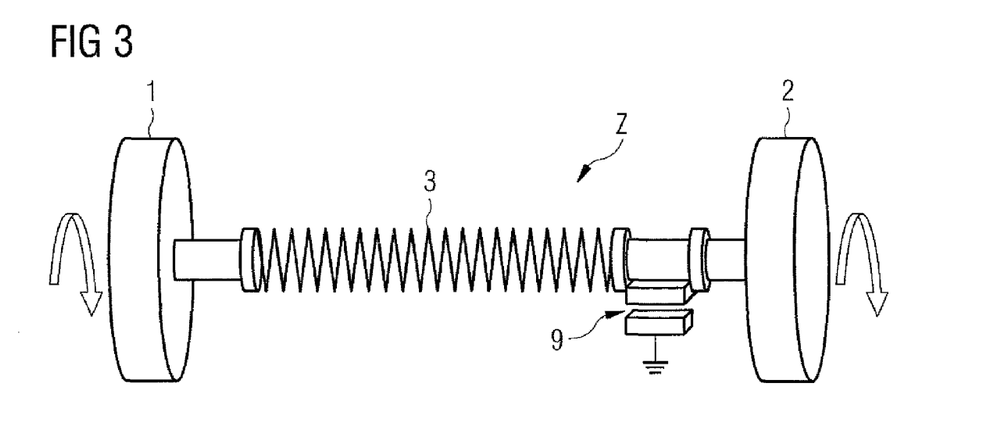

FIG. 3 shows a schematic embodiment in which the first element 1 is constructed as a rotating element. The mechanical energy storage device 3 and thus also the coupling element 3 are formed by a mechanical spring element, which forwards the energy stored in it similarly in the form of rotational movement to the second element 2. A holding element 9, in the embodiment, a magnetic holding element 9, is provided by means of a permanent magnet, which is arranged at the coupling point between the spring element 3 and the second element 2. The holding element prevents the transmission of mechanical energy to the second element until the retaining force of the holding element 9 is overcome.

Figure 4:
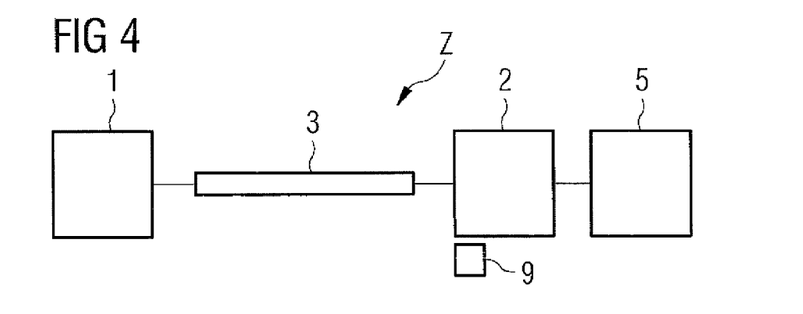

FIG. 4 shows a counter Z, which uses an electromechanical energy converter E as described above as an energy source and as a source for counting pulses. The electrical energy generated by the electromechanical converter 2 is transmitted to an evaluation device 5 in a burst-like way in the same manner in which it is generated. The evaluation device 5 is coupled electrically to the second element 2. The evaluation device 5 can be operated with the electrical energy generated by the second element 2. Thus, the number of counting pulses can also be evaluated by means of the evaluation device. So that it is sufficient to provide the evaluation device with an energy burst with each counting pulse, the evaluation device can detect the number of energy bursts and with each energy burst sufficient electrical energy is also supplied to perform the evaluation.

Figure 5:
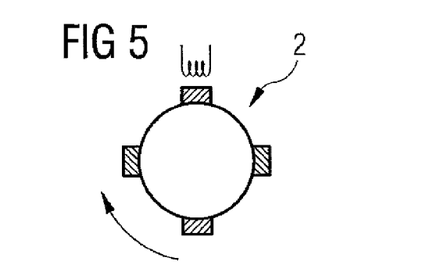

FIG. 5 shows a schematic diagram of a stepper motor as can be used, for example, in a counter Z. The stepper motor is constructed so that it generates an electrical pulse after each 90° angle of rotation. For this purpose, a total of four magnetic elements are arranged on a shaft, each at the same distance of 90° relative to each other. Thus, for each 90° rotation, an electrical pulse is generated. A second element 2 with a stepper motor, or step converter, constructed in this way would thus feed four electrical pulses to the evaluation device 5 for each complete rotation.

For example, if a rotational movement of ten rotations is introduced into the mechanical energy storage device 3, or into the coupling element 3, due to the volume flow of a fluid on the first element, then these ten rotations are stored in the coupling element. If the retaining force is set by means of the holding element 9 so that after ten rotations the retaining force is overcome, then 10 rotations or the energy equivalent to these ten rotations is output to the second element. Thus, 10 rotations are output to the element 2 after the upper energy level EO is exceeded. For the use of the step converter according to FIG. 5, 40 individual pulses are then fed to the evaluation device 5. With these 40 individual pulses, an alternating current signal lasting over 40 individual pulses is given, with which the evaluation device 5 can be operated.

Embodiments in which transmissions are provided in connection with the coupling element 3 shall not be described here in more detail. Nevertheless, the use of a transmission for the energy input Fin into the coupling element and also for the energy output Eout from the coupling element is possible and also advantageous depending on the field of use of the electromechanical energy converter E and the counter Z.

Figure 6:
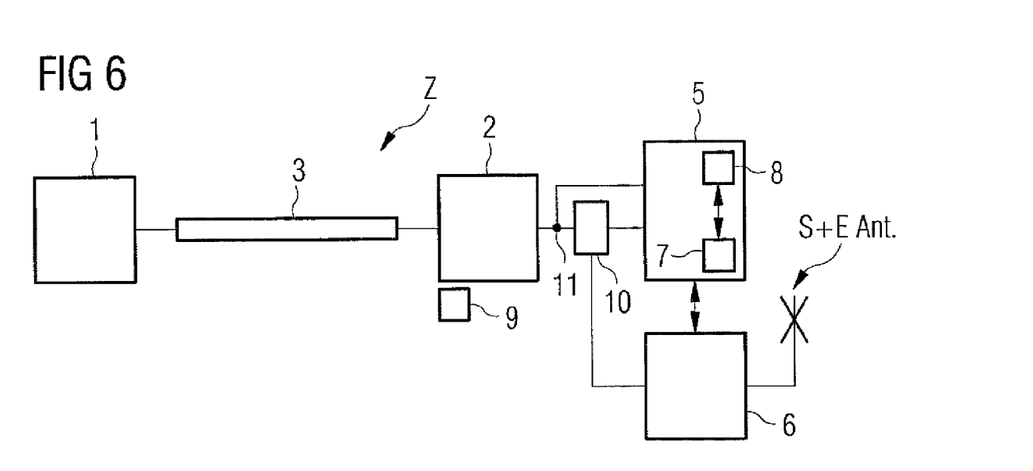

FIG. 6 shows a counter whose embodiment is improved relative to the embodiment described above. Integrated into the evaluation device 5, the counter Z of FIG. 6 includes an electronic computational unit 7 and an electronic memory 8. The electrical energy supply of the evaluation device 5 and thus of the electronic memory 8 integrated in it and the electronic computational unit 7 are powered with a rectified electrical voltage by means of a rectifying device 10. An electrical energy storage device 12 that is formed by a capacitor is allocated to the rectifying device.

Likewise, in the embodiment of FIG. 6, an electrical radio transmitter or a radio transmit-receive device 6 is provided, which is coupled to the evaluation unit 5. Thus, the information of the evaluation unit 5 can be transmitted with the energy from the rectifying unit 10 via a radio signal. A counting tap 11 is provided merely for counting the individual pulses between the rectifying unit 10 and the second element 2 and thus between the rectifying unit 10 and the electromechanical energy converter 2. By means of this counting tap, a signal with the counting pulses is fed to the evaluation unit 5.

In the embodiment shown in FIG. 6, a radio transmit-receive unit 6 is provided, which is constructed for transmitting the data calculated by the evaluation unit 5 together with an identification code and also for receiving radio signals of other counters or also radio signals of a central transmit-receive device ZE. The evaluation unit 5 is coupled to the radio transmit-receive unit and constructed to exchange data with this unit in a bidirectional way. Thus, received data can be fed to the evaluation unit 5 and thus to the memory unit 8 and/or also to the computational unit 7. Thus, complex evaluations are possible by calling the information from the receive unit. Also, an update of software provided in the counter is possible for calculating volume flows. Also, other parameters of the volume flow can be fed to the counter, so that, for example, a change in the medium to be detected can be reported to the counter in this way. This eliminates expensive recalibration or even reassembly of the counter if the medium to be detected is to be replaced by another medium. Thus, with the radio transmit-receive unit, a command can also be received from the outside for the counter, which can be used for different purposes. Thus, depending on the embodiment of the counter, recalibration for other counting media can also be performed.

Figure 7:
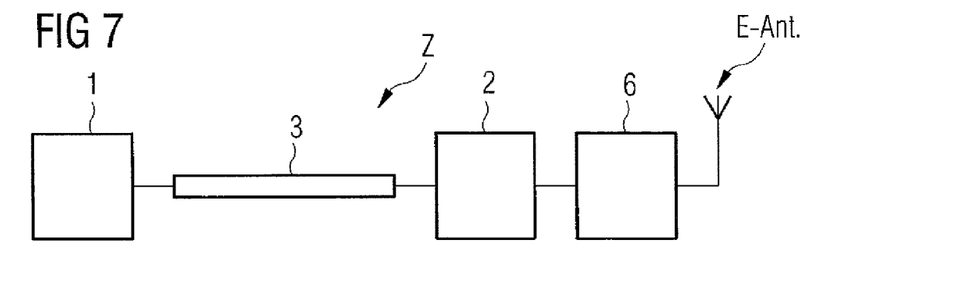

FIG. 7 shows an embodiment that includes a counter that has an especially simple and thus cost-effective construction. Each individual pulse of the electromechanical converter is fed directly to the radio transmit unit 6 and causes the transmission of a pulse-like radio signal. A central transmit-receive unit receives the pulse-like transmitted signals and determines the volume flow detected at the counter from the number of received pulses. This embodiment is suitable for mounting locations with few or no interfering elements and is beneficial in production and also in operation.

Figure 8:
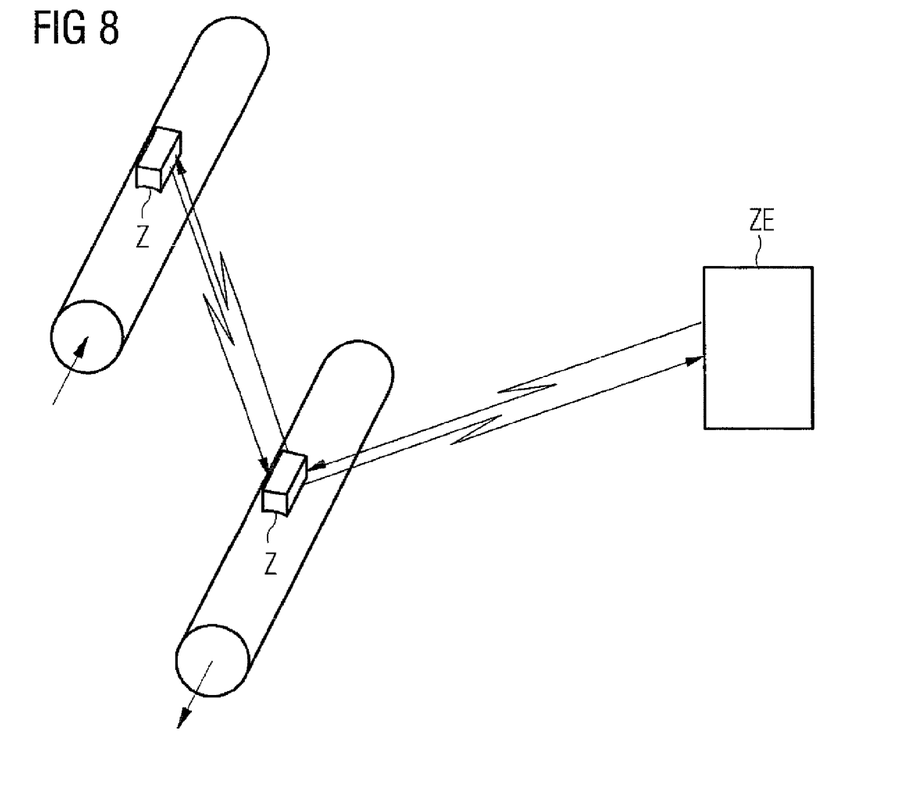

FIG. 8 shows a system that is formed from a plurality of counters Z, wherein these are equally equipped with radio transmit-receive units 6. Thus, each counter Z of the system is constructed to receive data of adjacent counters and then to transmit this data together with its own data. The diagram shows pipes, on each of which a counter is arranged. The pipes can carry a flow of fluid in the direction of the arrow. The counter that is spatially closest to the central receive unit ZE forwards the data material received from another remote counter Z to the central receive unit 6. Thus, radio distances can be covered that also go beyond the range of an individual counter Z. Preferably, the central receive unit ZE is also suitable for a transmission operation, so that a bidirectional data exchange with one or more counters is possible by means of radio transmission.

Figure 9:
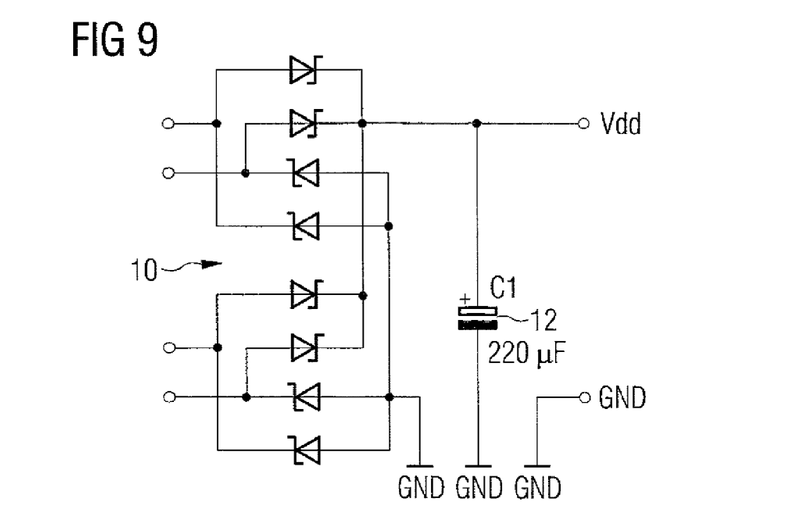

FIG. 9 shows, in one circuit diagram, the electrical rectifying unit 10, which is designed to convert pulses obtained from the electromechanical energy converter 2 into a direct current signal and to feed this signal to an electrical storage device 12. In the embodiment, the electrical memory device is formed by a capacitor with 220

Figure 10:
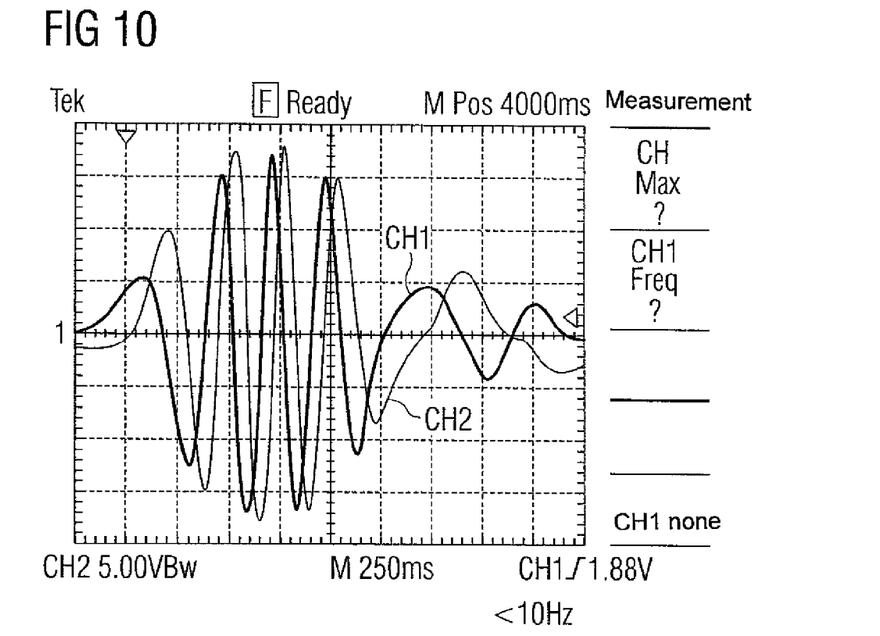
Figure 11:
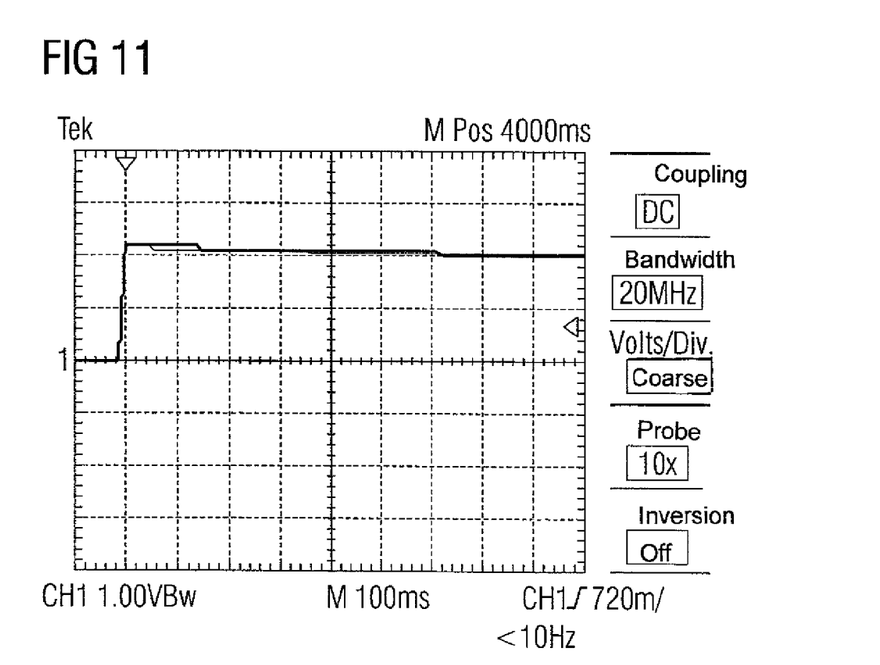
Figure 12:
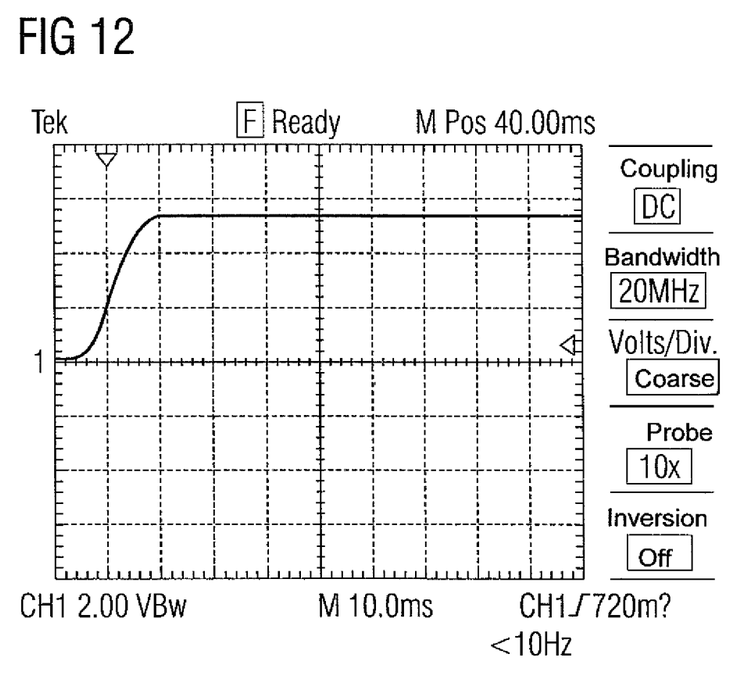

FIGS. 10, 11, and 12 show a measurement diagram of one test configuration of the electromechanical energy converter described above. The mechanical energy storage device is formed in this test configuration by a spiral spring. The energy input and thus the movement of the first element 1 is realized by an electric motor coupled to this first element via a gear. The second element 2 is formed by a stepper motor. As the holding device 9, two magnets are provided, wherein one magnet is fixed to the frame and the second magnet is coupled to a shaft arranged between the spiral spring and the second element 2. The mechanical energy is slowly introduced into the system. The diagram begins at the time when the upper energy level EO is reached. Starting at this time, the stepper motor delivers electrical voltage. With the described test configuration, according to the shown measurement diagram, a voltage of 9 V peak-to-peak is reached. The holding element is here constructed in such a way that a retaining force of 3 Nmm is reached.

By means of the rectifying device 10 described above, the voltage signal generated by the stepper motor is rectified and leads to a 2.2 V voltage signal on the output of the capacitor. FIG. 11 shows this in another measurement diagram of the test configuration described above. If the capacitance of the capacitor is smaller and thus also the electrical load of the electromechanical converter is smaller, then a voltage of 5.3 V can be achieved. The retaining force of the holding element was here limited to 3 Nmm. While maintaining this maximum torque but dividing the 360° rotation into two half-rotations each of 180°, the induction of the stepper motor is increased. Further energy optimization is possible by optimizing the capacitor. The test configuration delivers an output power of nearly 1 W/s. Thus, an electronic circuit like the evaluation device 5 described above and the radio transmit-receive device described above can be operated. In particular, no continuous operation of the circuits is necessary since all of the mechanical movements on the first element are stored in the mechanical energy storage device. In this way, a gap-less volume flow detection can be formed completely independently of energy sources that tend to require maintenance and are susceptible to disturbances, and the result of the volume flow detection can also be transmitted by means of radio to a remote central unit.

The invention claimed is:

1. An energy converter comprising:
   one first element and one second element;
   a coupling element, wherein the first element is coupled mechanically to the second element by said coupling element, wherein the coupling element is constructed both to store mechanical energy and also to output stored mechanical energy, and wherein the first element receives a movement of a medium and transmits to the coupling element;
   a holding element, configured to exert a predetermined retaining force and prevent a transmission of the movement to the second element until the retaining force is exceeded;
   wherein the coupling element outputs mechanical energy to the second element, and wherein the second element is constructed as an electromechanical converter, which converts the introduced movement energy into electrical energy;

a radio transmit device or a radio transmit and receive device coupled to the energy converter, wherein said device is operated by electrical energy generated by the energy converter; and wherein the energy converter is further configured to have at least one of a magnetic retaining force; a electromagnetic converter to generate the magnetic retaining force; and an electronic processing device configured as a counter that is electrically coupled to the energy converter and operated by the electrical energy generated by the energy converter.

2. The energy converter according to claim 1, wherein the first element converts the movement of the medium into a rotational movement or a longitudinal movement.

3. The energy converter according to claim 1, wherein the holding element forms a magnetic retaining force.

4. The energy converter according to claim 3, wherein the holding element includes at least one first magnet, which interacts with at least one magnetically active element, wherein the first magnet or the magnetically active element is arranged at a location fixed to the frame and the corresponding interacting element is arranged on the second element.

5. The energy converter according to claim 1, wherein the coupling element is formed by a spring element.

6. The energy converter according to claim 5, wherein the coupling element is formed by a mechanical spiral spring element.

7. The energy converter according to claim 1, wherein the electromechanical converter is constructed as an electromagnetic converter.

8. The energy converter according to claim 1, wherein the retaining force is formed by the electromagnetic converter.

9. The energy converter according to claim 7, wherein the electromagnetic converter is constructed according to the principle of a stepper motor.

10. The energy converter according to claim 1, wherein the first element is driven directly or indirectly by a fluid flow.

11. The energy converter according to claim 1, wherein the second element is mounted so that it can rotate.

12. A counter with an energy converter according to claim 1, wherein the energy converter is coupled electrically to an electronic processing device, wherein the processing device is operated by the electrical energy generated by the energy converter.

13. The counter according to claim 12, wherein the electromechanical converter is constructed for generating at least one electrical pulse for each traversed, preset angle of rotation or for each traversed, preset path distance.

14. The counter according to claim 12, wherein the processing device has an electronic memory and/or an electronic computational unit, which is designed to detect and/or to store the number of electrical pulses.

15. The counter according to claim 13, wherein each pulse generates a radio transmit signal, which can be received by means of a remote radio receive device and evaluated.

16. The counter according to claim 13, wherein the number of electronic pulses is summed and above a predetermined sum the processing device triggers a radio transmit signal in the radio transmit device, by means of which the number of pulses is transmitted.

17. The counter according to claims 12, wherein an electrical voltage rectifying unit is provided that is coupled to the electromechanical converter and an electrical energy storage device that is connected upstream of the radio transmit device or the radio transmit-receive device, and/or the evaluation unit, and wherein this/these device/s draws/draw the electrical energy for their operation from the electrical energy storage device.

18. A system with at least one counter according to claim 12, wherein a central receive device is provided that receives the data of the counter, evaluates it, and triggers actions as a function of predetermined parameters.

19. The system according to claim 12, each counter has a radio transmit-receive device, wherein each counter is constructed to receive data from an adjacent counter, to store the data, and to transmit the data together with its own data.

20. A method for converting mechanical energy into electrical energy, the method comprising:

receiving, from a first element, a mechanical movement and a second element mechanically coupled to the first element in such a way that the mechanical energy received from the movement is collected in a mechanical energy storage device before transmission to the second element providing a predetermined retaining force, which holds the second element up to a predetermined upper mechanical energy level in the mechanical energy storage device, and the second element is an electromechanical converter that converts the mechanical energy into electrical energy, wherein the energy converter is further configured to have at least one of a magnetic retaining force; a electromagnetic converter to generate the magnetic retaining force; and an electronic processing device configured as a counter that is electrically coupled to the energy converter and operated by the electrical energy generated by the energy converter; and operating, with the electrical energy which is generated by the electromechanical converter, a radio transmitter or a radio transmit-receive device that is coupled to the electromechanical converter.

21. The method according to claim 20, wherein a mechanical spring forms the mechanical coupling between the first element and the second element.

22. The method according to claim 20, wherein the retaining force is formed by a magnetic retaining force.

23. The method according to claims 20, wherein the electromechanical converter is constructed according to the principle of a stepper motor.

24. The method according to claim 20, wherein the first element is driven directly or indirectly by a fluid flow.

25. The method according to claim 20, wherein the first element is mounted so that it can rotate.

26. The method according to claim 20, wherein the second element is mounted so that it can rotate.

27. The method of claim 20, further comprising:

counting, by the processing device, rotations of the second element, wherein the electromechanical converter is electrically coupled to an electrical processing device, wherein the processing device is operated by the electrical energy generated by the electromechanical converter.

28. The counting method according to claim 27, wherein the electromechanical converter is constructed to generate at least one electrical pulse, which is allocated to a predetermined angle of rotation or a predetermined path distance.

29. The counting method according to claim 28, wherein the processing device has an electronic memory and/or an electronic computational unit, which is designed to detect and/or to store the number of electrical pulses.

30. The counting method according to claim 29, wherein each pulse generates a radio signal, which can be received and evaluated by a remote central receive device.

31. The counting method according to claim 28, wherein the number of electronic pulses is summed and above a predetermined sum the processing device triggers a radio transmit signal in the radio transmit device, with which the number of pulses is transmitted.

32. The counting method according to claim 27, wherein the electrical voltage generated by the electromechanical converter is fed at least partially to an electrical voltage rectifying unit and the rectified voltage is fed to an electrical energy storage device, wherein the radio transmitter or the radio transmit-receive device and/or the evaluation unit draw electrical energy for their operation from the electrical energy storage device.

* * * * *